United States Patent [19]

Thibault

[11] Patent Number: 4,981,704

[45] Date of Patent: Jan. 1, 1991

[54] PARTIAL HYDROLYSATE OF WHEY PROTEINS, ENZYMATIC PROCESS FOR THE PREPARATION OF THIS HYDROLYSATE, AND HYPOALLERGENIC DIETETIC MILK FOOD CONTAINING IT

[75] Inventor: Philippe A. Thibault, Romainville, France

[73] Assignee: Union des Cooperatives Laitieres d'Isigny-sur-Mer et de Sainte-Mer-Eglise, Isigny-sur-Mer, France

[21] Appl. No.: 381,245

[22] Filed: Jul. 18, 1989

[30] Foreign Application Priority Data

Jul. 18, 1988 [FR] France .................. 88 09669

[51] Int. Cl.$^5$ .......................... A23J 1/20; A23C 21/02
[52] U.S. Cl. .......................... 426/41; 426/42; 426/656; 426/657; 426/491; 426/495; 426/580
[58] Field of Search ............... 426/41, 42, 63, 657, 426/491, 495, 656, 580; 435/213

[56] References Cited

U.S. PATENT DOCUMENTS

| | | | |
|---|---|---|---|
| 2,650,166 | 8/1953 | Tinkler et al. | 426/41 |
| 4,001,437 | 1/1977 | Jaeggi et al. | 426/41 |
| 4,016,293 | 4/1977 | Coughlin et al. | 426/41 |
| 4,293,571 | 10/1981 | Olofsson et al. | 426/7 |
| 4,293,583 | 10/1981 | Farr et al. | 426/41 |
| 4,427,658 | 1/1984 | Maubois et al. | 424/177 |
| 4,482,574 | 11/1984 | Lee | 426/42 |
| 4,636,388 | 1/1987 | Lin et al. | 426/41 |

FOREIGN PATENT DOCUMENTS

| | | |
|---|---|---|
| 0022019 | 6/1980 | European Pat. Off. . |
| 0126290 | 4/1984 | European Pat. Off. . |
| 0226221 | 12/1986 | European Pat. Off. . |
| 3440734 | 11/1984 | Fed. Rep. of Germany . |
| 2487642 | 7/1980 | France . |

Primary Examiner—Marianne Cintins
Attorney, Agent, or Firm—A. W. Breiner

[57] ABSTRACT

The invention relates to biotechnology. It concerns a partial hydrolysate of whey proteins which contains no residual whole proteins characterized in that it contains peptides spread over the following distribution, as a function of their molar mass:

| Molar mass (g per mole) | Proportion by weight (as g peptides per 100 g total peptides) |
|---|---|
| MM > 5000 | 0–5 |
| 5000 > MM > 3500 | 15–25 |
| 3500 > MM > 1500 | 20–30 |
| 1500 > MM > 500 | 35–45 |
| MM < 500 | 5–10 | as well as the free amino acids; the free amino acid content of the hydrolysate being less than 10% (calculated as grammes of nitrogen per 100 grammes of total nitrogen), as well as an enzymatic product for its preparation:

Application to the production of dietetic milk foods.

6 Claims, No Drawings

PARTIAL HYDROLYSATE OF WHEY PROTEINS, ENZYMATIC PROCESS FOR THE PREPARATION OF THIS HYDROLYSATE, AND HYPOALLERGENIC DIETETIC MILK FOOD CONTAINING IT

The invention relates to a partial hydrolysate of whey proteins, an enzymatic process for the preparation of this hydrolysate, and a hypoallergenic dietetic milk food containing the said hydrolysate.

Dietetic milk foods for infants are often made from proteins extracted from bovine milk. In order to approach the composition of human milk, a particular formulation of the different ingredients of bovine milk is necessary, and, from the point of view of the proteins only, care must be taken to ensure that the weight of amino acids (and in particular the supply of essential amino acids such as threonine, tryptophan and lysine) is as close as possible to that of the proteins of human milk.

For this it is necessary, in particular, to rebalance the serum proteins/bovine milk caseine ratio in favour of the serum proteins. The dietetic milk foods thus obtained contain a high proportion of whey proteins. The following problem is therefore raised: the protein fractions of human and bovine whey do not have the same composition; in particular human whey does not contain any beta-lactoglobulin, while about half of the protein fraction of bovine whey is represented by beta-lactoglobulin. This difference in composition is the cause of allergic phenomena in certain infants when the latter are fed with milks with a composition based on serum proteins of bovine origin. This allergy is shown in particular by digestive troubles (abdominal pains, diarrhoeas, vomiting).

Beta-lactoglobulin is not the only cause, although it has the greatest allergenic power (major antigen), alpha-lactalbumin may also be the cause of allergic phenomena.

Various solutions have been proposed in the past in order to improve the digestibility of milk foods based on whey proteins, for example thermal denaturation of the proteins or quantitative elimination of the lactoglobulins. More recently, the hydrolysis of the serum proteins by an enzymatic route has been suggested.

FR-A-No. 2,450,842 describes a process for the preparation of a purified protein hydrolysate free of proteins and macropeptides, in which an aqueous solution of proteins is hydrolysed, for example using pancreatin, and the hydrolysis product is subjected to a thermal treatment which denatures the residual proteins, and the said proteins are then eliminated by ultra-filtration, the ultra-filtration permeate constituting the purified protein hydrolysate. The proteins may be of various origins, in particular whey proteins. The patent gives no precise indications of the peptide composition of the hydrolysate obtained.

EP-A-No.22,019 describes a total enzymatic hydrolysate of whey proteins and a process for its preparation. The hydrolysate, which contains practically no residual proteins, consists of peptides, at least 50% of which contain 2 to 5 amino acids (that is a molar mass less than about 700), the proportion of free amino acids being less than 15%. Here it is a question of a hydrolysate which has undergone very extensive hydrolysis, which is intended for the enteral feeding of the sick. Such a degree of hydrolysis is not necessary for the production of dietetic milk foods. The process for the preparation of this total hydrolysate uses enzymatic hydrolysis of whey proteins with a proteolytic enzyme, such as pancreatin and the said hydrolysis may be preceded and/or followed by an ultra-filtration stage.

The present invention aims to provide a new partial hydrolysate of whey proteins which is appropriate to the production of hypoallergenic dietetic milk foods suitable for the feeding of infants and those who are allergic to bovine milk, as well as a a process for its preparation.

More particularly, the invention relates to a partial hydrolysate of whey proteins which contains no residual whole proteins, characterized in that it contains peptides spread over the following distribution, as a function of their molar mass:

| Molar mass (g per mole) | Proportion by weight (as g peptides per 100 g total peptides) |
|---|---|
| MM > 5000 | 0–5 |
| 5000 > MM > 3500 | 15–25 |
| 3500 > MM > 1500 | 20–30 |
| 1500 > MM > 500 | 35–45 |
| MM < 500 | 5–10 | as well as free amino acids; the free amino acid content of the hydrolysate being less than 10% (calculated as grammes of nitrogen per 100 grammes of total nitrogen).

The invention also relates to a hypoallergenic dietetic milk food containing the said partial hydrolysate.

Finally the invention relates to an enzymatic process for the preparation of the said partial hydrolysate, which comprises the following stages:

(a) enzymatic hydrolysis, using a mixture of the enzymes chymotrypsin and trypsin having a chymotrypsin/trypsin activity ratio of between 1.5 an 3.0, of a substrate chosen from wheys defatted and/or demineralized wheys, concentrated wheys, concentrated defatted and/or demineralized wheys and aqueous solutions of proteins extracted from said wheys at a pH of 7.5 to 9.0 and a temperature of 40° to 60° C. for a time which allows the peptide distribution defined above to be obtained, the ratio chymotrypsin/total substrate proteins being between 20,000 and 300,000 ATEE units per 100 g of total proteins; and (b) separation of the enzymes and the residual unhydrolysed proteins.

According to one embodiment, a mixture of soluble enzymes is used and stage (b) is carried out by ultra-filtration and/or dia-filtration using at least one membrane having a threshold of less than 10,000.

According to another embodiment, a mixture of immobilized enzymes is used and stage (b) consists firstly in separating the immobilized enzymes by decantation, centrifugation and/or filtration, then separating the unhydrolysed residual proteins by ultrafiltration and/or dia-filtration using at least one membrane having a threshold of less than 10,000, in order to obtain the hydrolysate.

According to a variant of the embodiment in which a mixture of immobilized enzymes is used, stage (b) consists firstly in separating the immobilized enzymes by decantation, centrifugation and/or filtration, then in causing the precipitation of the unhydrolysed residual proteins by heating the product obtained to a temperature of 60° to 70° C. in an acid medium, and then in separating the resulting precipitate by centrifugation or micro-filtration from the rest of the product which constitutes the hydrolysate.

The product of the invention is a partial hydrolysate of whey proteins which has the characteristic of limiting allergic reactions when it is incorporated in a dietetic milk food, and in particular in a milk of a composition intended for infants (hypoallergenic dietetic milk food for infants).

It has the following characteristics:

Absence of whole (unhydrolysed) proteins.

Limited concentration of free amino acids (maximum 10 g of nitrogen in the form of amino acids per 100 g of total nitrogen). This characteristic has the advantage, when compared with a higher level of free amino acids, of limiting the osmotic pressure within the organism and of increasing the ease of immediate assimilation of the nitrogenous matter.

Presence of medium-sized peptides (3,500 > molar mass > 1500). This characteristic is important from the point of view of the formulation of the milk food. In fact, the composition of the finished product includes fat (generally of the order of 20% of the dry matter) and this must be easily dispersible, without forming a second phase, during the reconstitution of the milk by the addition of water. For this reason, emulsifying compounds must be present in the formulation; medium-sized peptides from whey proteins have a good emulsifying power, and this property disappears as the peptide becomes shorter. It is therefore worthwhile to keep a mediumsized peptide fraction in the hydrolysate.

The hydrolysate of the invention has the following peptide distribution:

| Molar mass (g per mole) | Proportion by weight (g peptides per 100 g) total peptides |
|---|---|
| MM > 5000 | 0–5 |
| 5000 > MM > 3500 | 15–25 |
| 3500 > MM > 1500 | 20–30 |
| 1500 > MM > 500 | 35–45 |
| MM < 500 | 5–10 |

The process of the invention is based on a partial hydrolysis of the whey proteins until the alpha-lactalbumin is totally eliminated, using an optimized mixture of trypsin and chymotrypsin, followed by a procedure for the separation of the enzymes and the residual or insufficiently hydrolysed proteins, on the one hand, and of the peptides which it is desired to collect, on the other hand.

The operating conditions have been optimized in order to attain the highest productivity levels possible.

Starting materials which can be used.

The hydrolysis may be carried out directly starting with wheys of various origins: acid (fresh cheese, casein factories) or sweet (pressed cheese). These may be used as such, or previously defatted and/or demineralized. Such wheys which have been concentrated (dry extract to about 20%) may also be used as a starting material for hydrolysis.

The hydrolysis may also be carried out starting with proteins extracted from the different wheys mentioned above. These proteins may be obtained in a more or less purified state by various processes: chromatography by ion exchange or gel filtration, precipitation or ultra-filtration. The most appropriate, because the most economical, of all these techniques, and that which is most often employed industrially is ultra-filtration. Preparations of undenatured proteins containing about 75 to 85% of proteinaceous matter (with respect to the dry extract) are thus obtained. Solutions containing about 100 to 150 g proteins per litre are made up from these preparations of purified proteins (dry or hydrated).

The wheys or the preparations of reconstituted proteins may be used as such or previously clarified by centrifugation or microfiltration.

The microbiological quality of the starting materials will be ensured; in fact, certain operating conditions of the enzymatic hydrolysis (pH and temperature) are favourable to microbial growth which is undesirable for the quality of the finished product. A Pasteurization or sterilization operation on the starting material, before hydrolysis, may therefore have to be carried out.

Enzymes used

For the purposes of the invention, a mixture of trypsin and chymotrypsin, the action specificities of which are complementary, is used as the enzyme mixture. In fact, the two proteases, working separately, do not allow a hydrolysate having the desired characteristics to be obtained.

Definition of Units of Enzyme Activity

Tryptic activity: this is expressed from a system of hydrolysis of a synthetic substrate, BAEE (N-benzoyl-L-arginine ethyl ester). The trypsin hydrolyses the BAEE and liberates protons. Using a 50 mM TRIS/HCl buffer at pH 8.0, a solution containing 100 mM BAEE and 20 mM calcium chloride is prepared.

Chymotryptic activity: this is expressed from a system of hydrolysis of another synthetic substrate, ATEE (N-acetyl-L-tyrosine ethyl ester). The chymotrypsin hydrolyses the ATEE and liberates protons. The preparation may be carried out in the following manner: 135 mg ATEE are dissolved in 1 ml methanol, then 9 ml 50 mM TRIS/HCl buffer at pH 8.0 are added (ATEE: 50 mM).

The preparations of synthetic substrate (BAEE for trypsin or ATEE for chymotrypsin) are placed at 30° C. in a pH-stat, and after addition of the enzyme the quantity of base (soda or potash, for example) used to maintain the pH at 8.0 is measured.

A Unit of Tryptic Activity is the quantity of trypsin which catalyses the hydrolysis of one micro-mole of BAEE per minute in the measuring conditions described above.

One Unit of Chymotryptic Activity is the quantity of chymotrypsin which catalyses the hydrolysis of one micro-mole of ATEE per minute in the measuring conditions described above.

Ratio of the two protease activities

It is not suitable, for the purposes of the invention, to have any ratio of chymotrypsin/trypsin activity in the protease mixture which catalyses the hydrolysis of the whey proteins. In fact, it has been discovered that in order to have the best hydrolysis results, from the kinetic point of view but also to obtain the desired hydrolysate, it is necessary to use a mixture of trypsin and chymotrypsin which is such that the ratio of the chymotrypsin/trypsin activities expressed in the ATEE/BAEE system described above is between 1.5 and 3.0.

Enzymes/substrate (proteases/proteins) ratio

This ratio has an influence on the peptide profile of the hydrolysate obtained, as well as on its content of free amino acids. It is therefore of great importance for the purpose of the invention.

A proteases/proteins ratio will be chosen which is sufficiently low obtain the desired hydrolysate, but also sufficiently high to comply with kinetics which are compatible with industrial applications.

A chymotrypsin/total proteins ratio of between 20,000 ATEE Units and 300,000 ATEE Units per 100 grammes of total proteins will be adopted.

The trypsin/total proteins ratio will be deduced as a function of the chymotrypsin/trypsin ratio already chosen. For example, it may be decided to adopt a chymotrypsin/trypsin ratio of 2.0 and chymotrypsin/total proteins ratio of 100,000 ATEE units per 100 grammes. The trypsin/total proteins ratio will therefore be 50,000 BAEE units per 100 grammes.

Method of use of the enzymes

The two proteases may be used in solution in the preparation to be hydrolysed ( whey or solution of purified proteins), or else immobilized on insoluble supports.

In the latter case, all the known methods for immobilization of enzymes (by adsorption or by covalent bonds) and any solid support, provided that the latter is compatible with the application envisaged, may be used.

It will be necessary, however, that the method and the support adopted should allow the chosen chymotrypsin/trypsin ratio to be retained after immobilization. It is thus preferable to select methods which allow the enzymes to be associated with the support by means of covalent bonds. The composites obtained will then have better stability.

As an indication, supports such as porous beads of silica or alumina, or even ground and graded corn grits (or stovers), may be used. Firstly primary amine functions will be attached to such supports, for example:

(a) using silanes for siliceous or alumina-based supports;
(b) after an oxidation treatment (using sodium metaperiodate for example), using ethylenediamine preparations, for corn stalks.

Secondly, the attached functions will be activated, for example using glutaraldehyde.

Then the addition of protease mixtures to the supports (corn grits (or stovers), silicas or aluminas), followed by an optional crosslinking, will allow stable composites to be obtained, the chymotrypsin/trypsin ratio of which will be close to that which has been chosen.

Hydrolysis method and analytical controls

The pH of the chosen starting material whey or solution of purified proteins) will be adjusted to a value which is compatible with a good simultaneous functioning of the two proteases. These have a slightly different pH values for optimum activity: from 8 to 8.5 for chymotrypsin and from 8.5 to 9.0 for trypsin.

It will therefore be chosen to adjust the pH within a range between 7.5 and 9.0, and preferably between 8.0 and 8.5.

The pH will be adjusted using a base which is compatible with the applications envisaged. Generally it will be possible to use soda (sodium hydroxide), potash (potassium hydroxide), ammonia or a mixture of these bases in order to balance the supply of cations.

The hydrolysis reaction will be carried out in a system in which the pH and temperature are regulated.

The pH will be maintained at its starting value by the addition of a base.

The assigned temperature will be such that high enzymatic activities can be obtained (and thus the hydrolysis time or the quantity of enzymes used can be reduced), with a suitable stability.

A relatively high temperature will also allow microbial growth to be limited or avoided.

The temperature will be between 40° and 60° C., and preferably between 45° and 50° C.

The starting material which is to be treated may be put in contact with the enzymes:

(a) in a stirred solution in the reactor in the case of soluble proteolytic preparations;
(b) in a moderately stirred bed, or in recirculation on a fixed bed, in the case of preparations of immobilized proteases.

The method by which the hydrolysis works is discontinuous, the principle being to stop hydrolysis at the moment at which the distribution of molar masses of the different types of peptides conforms to the desired product.

The reaction kinetics will essentially be a function of the temperature adopted and of the enzymes/substrate ratio chosen, and also, to a lesser extent, of the pH and of the chymotrypsin/trypsin ratio (which is between 1.5 and 3.0).

First of all, in order to find out the exact hydrolysis time for well-defined operating conditions, and to control the hydrolysate produced at the end of the treatment an analysis of the peptide profile is carried out by gel permeation chromatography.

This analysis may be carried out, following the same principle (separation of species according to their sizes: families of molar masses), using different and appropriate chromatography gels. A examples, the Sephadex G15 gels, which distinguish and separate the peptide species the molar mass of which is less than 1500, and the Sephadex G25 gels, which distinguish and separate the peptide species the molar mass of which is between 1,000 and 5,000, may be mentioned.

It is seen that, to characterize the product of the invention, which comprises a majority of peptides the molar mass of which extends from 500 to 5,000, it is necessary to use two complementary chromatography systems: one using Sephadex G15 and the other using Sephadex G25.

The use of Sephadex G15 and G25 gels requires a relatively long space of time. Results may be obtained more rapidly (although with less precision) by F.P.L.C.(Fast Protein Liquid Chromatography) using, for example, a Superose 12 chromatography column.

All these chromatography systems (G15, G25 and FPLC) must be carried in an acid medium (citrate buffer or presence of acetic acid or formic acid) in order to avoid the phenomenon of the condensation of peptides in a neutral medium which is the origin of overestimation of the size of peptides. A maximum pH of 3.0 is required.

Analysis of the eluted fractions is carried out by measuring the optical density at 280 nm, 237 nm or 215 nm depending on the eluents used, or even by measuring the free amine groups with ninhydrin.

Thus, for well determined and well controlled operating conditions, a series of consecutive analyses of the peptide profiles allows a knowledge of the necessary hydrolysis time for the desired degree of hydrolysis to be attained. This degree of hydrolysis corresponds with a particular quantity of base consumed, and as a consequence, it will be useful and more practical for subsequent operations to carry out hydrolysis until this given quantity of base has been reached.

Chromatography will then only intervene at the end of the hydrolysis to monitor the peptide profile of the hydrolysate.

When the desired degree of hydrolysis is reached, the reaction must be stopped. For this, the medium could be acidified (pH≦4.0) and the temperature taken to a value less than 20° C.

Elimination of the residual proteins and enzymes

When hydrolysis is finished the treated preparation contains, on the one hand, the peptides and amino acids which it is desired to recover and, on the other hand, the residual proteins and the proteolytic enzymes.

The residual proteins are represented essentially by the structures which are hydrolysable with the most difficulty by the enzymatic system adopted; serum albumin and immunoglobulins are principally involved.

Two strategies may be adopted according to whether the hydrolysis has been carried out using soluble enzymes or using immobilized enzymes:

(a) Soluble enzymes: the insolubilization capacities of the residual proteins and of the two proteases are different, and it is not easy to carry out a coprecipitation of these two types of proteins. On the other hand, all the proteinaceous structures may easily be eliminated by ultra-filtration. For this, all the types of membrane and all the ultra-filtration systems sold are suitable, but the threshold of the membranes must be less than or equal to 10,000. The ultrafiltration is carried out normally according to the known procedures for this type of operation.

Ultra-filtration/dia-filtration could also be carried out in order to recover the maximum nitrogenous matter.

It is the recovered ultra-filtration permeate (that is to say, the product which has passed across the membrane) which constitutes the hydrolysate of the invention.

(b) Immobilized enzymes: the composite of immobilized enzymes is first of all separated from the hydrolysed preparation.

In the case of the process using a fixed bed, separation is easy; in the case of a stirred-bed procedure, the method of separation will be a function of the type of support. It is generally carried out by simple decantation, filtration or centrifugation.

The liquid phase recovered contains this time nitrogenous matter which is only of dairy origin (residual proteins, peptides and amino acids). Therefore the protein may be extracted in two manners:

Ultra-filtration or ultra-filtration/dia-filtration as described above.

Thermisation: peptides and amino acids have a greater solubility than proteins, and the proteins may consequently be selectively precipitated from the medium. These are then separated from the peptides by centrifugation or by micro-filtration.

Precipitation of the proteins is carried out by the combined effects of heat and pH. The hydrolysate is taken to a temperature of at least 60° C. and at most 70° C. The pH is adjusted to 4.0. For this any acid which is compatible with the envisaged application (hydrochloric, lactic, citric, acetic or phosphoric), may be used. For example, the preparation is left for 1 hour at 60° C. or 30 min at 70° C., then the precipitated proteins are separated.

The supernatant obtained contains the hydrolysate of the invention.

The hydrolysate of the invention obtained either by ultra-filtration or by thermisation may then be dried or concentrated in order to give a good microbiological stability.

The following non-limiting examples are given in order to illustrate the invention.

Examples 1 to 4 illustrate the kinetics observed as a function of different enzymes/substrate ratios.

EXAMPLE 1

An aqueous solution with 10% dry extract (that is 7.5% proteins) is prepared from a powder of whey proteins purified to 75% proteins by ultra-filtration.

The pH of the solution is adjusted to 8.0 using soda.

The solution is heated to 50° C. in a reactor provided with a means of regulating the pH.

A mixture of trypsin and chymotrypsin is prepared so as to contain 1,350 BAEE Units of trypsin and 2,750 ATEE Units of chymotrypsin per gramme of proteins used.

After addition of the protease mixture, the pH is maintained at 8.0 by the addition of soda.

After 1 hour of hydrolysis, the pH is adjusted to 6.0 using hydrochloric acid, the temperature is reduced to 20° C. and an ultra-filtration is carried out using a membrane with a threshold of 5,000 (MM).

The ultra-filtration permeate constitutes the hydrolysate which it is wished to obtain.

EXAMPLE 2

An aqueous solution containing 10% dry extract is prepared from a powder of whey proteins purified by ultra-filtration to 75% proteins.

The pH of the solution is adjusted to 8.0 using soda.

The solution is heated to 50° C. in a reactor provided with a means of regulating the pH.

A mixture of trypsin and chymotrypsin is prepared so as to contain 700 BAEE Units trypsin and 1,400 ATEE Units chymotrypsin per gramme of proteins used.

After addition of the protease mixture, the pH is maintained at 8.0 by the addition of soda.

After 2.5 hours of hydrolysis, the pH is adjusted to 6.0 using hydrochloric acid, the temperature is reduced to 20° C. and an ultra-filtration is carried out using a membrane with a threshold of 5,000 (MM).

The ultra-filtration permeate constitutes the hydrolysate which it is wished to obtain.

EXAMPLE 3

An aqueous solution containing 10% dry extract is prepared from a powder of whey proteins purified by ultra-filtration to 75% proteins.

The pH of the solution is adjusted to 8.0 using soda.

The solution is heated to 50° C. in a reactor provided with a means of regulating the pH.

A mixture of trypsin and chymotrypsin is prepared so as to provide 300 BAEE Units trypsin and 600 ATEE Units chymotrypsin per gramme of proteins used.

After addition of the protease mixture, the pH is maintained at 8.0 by the addition of soda.

After 8 hours of hydrolysis, the temperature is reduced to 20° C. and an ultra-filtration is carried out using a membrane with a threshold of 5,000 (MM).

The ultra-filtration permeate constitutes the hydrolysate which it is wished to obtain.

EXAMPLE 4

An aqueous solution containing 10% dry extract is prepared from a powder of whey proteins purified by ultra-filtration to 75% proteins.

The pH of the solution is adjusted to 8.0 using soda.

The solution is heated to 50° C. in a reactor provided with a means of regulating the pH.

A mixture of trypsin and chymotrypsin is prepared so as to provide 150 BAEE Units trypsin and 300 ATEE Units chymotrypsin per gramme of proteins used.

After addition of the protease mixture, the pH is maintained at 8.0 by the addition of soda.

After 15 hours of hydrolysis, an ultra-filtration is carried out using a membrane with a threshold of 5,000 (MM).

The ultra-filtration permeate constitutes the hydrolysate which it is wished to obtain.

Examples 5 to 7 illustrate the application of the process to different types of whey.

EXAMPLE 5

The starting material for hydrolysis is a whey from pressed cheese, concentrated by reverse osmosis to 22.6% dry extract. Its initial pH is 6.3 and its total nitrogenous matter represents 14.6% of the dry extract.

The pH of the whey is adjusted to 8.0 using soda, and then this is placed at 50° C. in a reactor provided with a system for regulating the pH.

A mixture of trypsin and chymotrypsin is prepared so as to provide 1,350 BAEE Units trypsin and 2,750 ATEE Units chymotrypsin per gramme of proteins used, that is 4,500 BAEE Units of trypsin and 9,100 ATEE Units of chymotrypsin per 100 grammes of concentrated whey used.

After addition of the protease mixture, the pH is maintained at 8.0 by the addition of soda.

After 1 hour of hydrolysis, the pH is adjusted to 6.0 using hydrochloric acid, the temperature is reduced to 20° C., then an ultra-filtration of the hydrolysed whey is carried out.

The peptide profile of the permeate obtained corresponds to the type of hydrolysate required.

EXAMPLE 6

The starting material for hydrolysis is a whey from pressed cheese, which has been demineralized by electrodialysis and concentrated by reverse osmosis.

Its principal characteristics are the following:
Dry extract: 21.3%
Total nitrogenous matter: 15.4% of the dry extract
Ash: 0.9% of the dry extract
Initial pH: 5.0

The pH is adjusted to 8.0 using soda, then the concentrated whey is placed at 50° C. in a reactor provided with a means of regulating the pH.

A mixture of trypsin and chymotrypsin is prepared so as to provide 1,350 BAEE Units trypsin and 2,750 ATEE Units chymotrypsin per gramme of proteins used, that is 4,500 BAEE Units of trypsin and 9,100 ATEE Units of chymotrypsin per 100 grammes of concentrated whey used.

After addition of the protease mixture, the pH is maintained at 8.0 by the addition of soda.

After 1 hour of hydrolysis, the pH is adjusted to 5.0 using hydrochloric acid, the temperature is reduced to 20° C., then an ultra-filtration of the hydrolyzed whey is carried out.

The ultra-filtration permeate constitutes the hydrolysate which it is wished to obtain.

EXAMPLE 7

The starting material for the hydrolysis is a whey from pressed cheese having 6% dry extract. Its initial pH is 6.5 and the total nitrogenous matter represents 14% of the dry extract.

The pH is adjusted to 8.0 using soda, then the whey is placed at 50° C. in a reactor provided with a means of regulating the pH.

A mixture of trypsin and chymotrypsin is prepared so as to provide 700 BAEE Units trypsin and 1,400 ATEE Units chymotrypsin per gramme of proteins used, that is 600 BAEE Units of trypsin and 1,200 ATEE Units of chymotrypsin per 100 grammes of whey used.

After addition of the protease mixture, the pH is maintained at 8.0 using soda.

After 2.5 hours, hydrolysis, the pH is adjusted to 6.5 using hydrochloric acid, the temperature is lowered to 20° C., then an ultra-filtration is carried out.

The ultra-filtration permeate constitutes the hydrolysate which it is wished to obtain.

EXAMPLE 8

This example illustrates the implementation of the process using immobilized enzymes.

A composite of proteases immobilized by covalent bonds to an inorganic support is prepared in the following manner:

Support: these are beads of porous silica the mean diameter of which is 450 microns. The mean diameter of the pores is 350 Angstroms, and the mean specific surface area is 35 $m^2$ per gramme.

The primary amine functions are grafted to this support according to the following protocol:

1 gramme of dry support is put in contact with 100 ml of a 0.5% solution of gamma-aminopropyltriethoxysilane, the pH of which has been adjusted to 4.5 by the addition of acetic acid.

Stirring for 1 hour at 70° C.

Liberal rinsing with water.

The support (1 gramme) is then activated for 2 hours at 20° C. using an aqueous 2.5% solution of glutaraldehyde (100 ml), then liberally rinsed.

A mixture of 3,500 BAEE Units trypsin and 7,000 ATEE Units chymotrypsin is prepared in 100 ml 50 mM phosphate buffer at pH 7.0, and put in contact with 1 gramme of activated support at 4° C. for 16 hours.

After rinsing the support, crosslinking of the proteases is carried out at 20° C. for 2 hours, using 100 ml of an aqueous 2.5% solution of glutaraldehyde for 1 gramme of support.

The proteases which are only adsorbed are then eliminated by three 15 min washings using a molar solution of sodium chloride ((100 ml for 1 gramme of support, that is a total of 300 ml).

This operation takes place at 20° C. and is followed by liberal rinsing.

The hydrolysis reaction is carried out in the following manner:

Starting material: whey from pressed cheese, concentrated to 22.6% dry extract by reverse osmosis. Its initial pH is 6.3 and its total nitrogenous matter represents 14.6% of the dry extract.

Hydrolysis:

The pH of the whey is adjusted to 8.0 using soda then 150 g of the composite of immobilized proteases is put in contact with 500 g of whey, at 40° C., with slow stirring in order to maintain the composite in suspension in the whey.

The pH is regulated to 8.0 by the addition of soda.

After 20 hours of hydrolysis, the composite is separated from the whey by decantation.

The pH of the whey is adjusted to 4.0 using hydrochloric acid and the preparation is taken to 60° C. for 1 hour, then centrifuged. The supernatant recovered represents the hydrolysate which it is wished to obtain.

It is obvious that the embodiments described are only examples and that they could be modified, in particular by substituting equivalent techniques, without for that reason departing from the scope of the invention.

I claim:

1. Partial hydrolysate of whey proteins which comprises peptides spread over the following distribution, as a function of their molar mass:

| Molar mass (g per mole) | Proportion by weight (as g peptides per 100 g total peptides) |
|---|---|
| MM > 5000 | 0–5 |
| 5000 > MM > 3500 | 15–25 |
| 3500 > MM > 1500 | 20–30 |
| 1500 > MM > 500 | 35–45 |
| MM < 500 | 5–10 | and free amino acids; the free amino acid content of the hydrolysate being less than 10% (calculated as grams of nitrogen per 100 grams of total nitrogen) and said partial hydrolysate containing no residual whole proteins.

2. Hypoallergenic dietetic milk food which comprises the hydrolysate as defined in claim 1.

3. Enzymatic process for the preparation of a partial hydrolysate of whey proteins which comprises peptides spread over the following distribution, as a function of their molar mass:

| Molar mass (g per mole) | Proportion by weight (as g peptides per 100 g total peptides) |
|---|---|
| MM > 5000 | 0–5 |
| 5000 > MM > 3500 | 15–25 |
| 3500 > MM > 1500 | 20–30 |
| 1500 > MM > 500 | 35–45 |
| MM < 500 | 5–10 | and free amino acids; the free amino acid content of the hydrolysate being less than 10% (calculated as grams of nitrogen per grams of total nitrogen) and said partial hydrolysate containing no residual whole proteins, which comprises the following stages:

(a) enzymatic hydrolysis, using a mixture of the enzymes chymotrypsin and trypsin having a chymotrypsin/trypsin activity ratio of between 1.5 and 3.0, of a substrate chosen from wheys, defatted and/or demineralized wheys, concentrated wheys, concentrated defatted and/or demineralized wheys and aqueous solutions of proteins extracted from said wheys, at a pH of 7.5 to 9.0 and a temperature of 40° to 60° C. for a time which allows the peptide distribution to be obtained, the ratio chymotrypsin/total substrate proteins being between 20,000 and 300,000 ATEE units per 100 g of total proteins; and (b) separation of the enzymes and the residual unhydrolysed proteins.

4. Process according to claim 3, in which a mixture of soluble enzymes is used, and in which said stage (b) is carried out by ultra-filtration and/or diafiltration using at least one membrane having a threshold of less than 10,000.

5. Process according to claim 3, in which a mixture of immobilized enzymes is used, and in which said stage (b) consists firstly in separating the immobilized enzymes by decantation, centrifugation and/or filtration, then separating the unhydrolysed residual proteins by ultra-filtration and/or dia-filtration using at least one membrane having a threshold of less than 10,000, in order to obtain the hydrolysate.

6. Process according to claim 3, in which a mixture of immobilized enzymes is used, and in which said stage (b) consists firstly in separating the immobilized enzymes by decantation, centrifugation and/or filtration, then in causing the precipitation of the unhydrolysed residual proteins by heating the product obtained to a temperature of 60° to 70° C. in an acid medium, and then in separating the resulting precipitate by centrifugation or micro-filtration from the rest of the product which constitutes the hydrolysate.

* * * * *